United States Patent [19]
Katsube et al.

[11] Patent Number: 5,453,981
[45] Date of Patent: Sep. 26, 1995

[54] METHOD OF CONTROLLING COMMUNICATION NETWORK INCORPORATING VIRTUAL CHANNELS EXCHANGE NODES AND VIRTUAL PATHS EXCHANGE NODES

[75] Inventors: Yasuhiro Katsube; Toshikazu Kodama, both of Tokyo, Japan

[73] Assignee: Kabushiki Kaisha Toshiba, Kawasaki, Japan

[21] Appl. No.: 300,557

[22] Filed: Sep. 6, 1994

Related U.S. Application Data

[63] Continuation-in-part of Ser. No. 777,164, Oct. 16, 1991, abandoned.

[30] Foreign Application Priority Data

Oct. 16, 1990 [JP] Japan .................................. 2-275381

[51] Int. Cl.⁶ .............................. H04L 12/56; H04J 3/24; H04J 3/16
[52] U.S. Cl. ........................ 370/60.1; 370/79; 370/94.2
[58] Field of Search ...................... 370/60, 60.1, 79, 370/84, 91, 94.1, 94.2, 94.3, 112, 118, 119, 13, 17; 379/219, 220

[56] References Cited

U.S. PATENT DOCUMENTS

| | | | |
|---|---|---|---|
| 4,984,264 | 1/1991 | Katsube | 370/60 |
| 5,130,978 | 7/1992 | Mobasser | 370/60 |
| 5,140,584 | 8/1992 | Suzuki | 370/60 |
| 5,179,556 | 1/1993 | Turner | 370/94.1 |
| 5,271,005 | 12/1993 | Takase et al. | 370/79 |
| 5,280,475 | 1/1994 | Yanagi et al. | 370/60 |
| 5,285,446 | 2/1994 | Yonehara | 370/60.1 |

*Primary Examiner*—Hassan Kizou
*Attorney, Agent, or Firm*—Oblon, Spivak, McClelland, Maier, & Neustadt

[57] ABSTRACT

A method of controlling a communication network including VC exchange nodes and VP exchange nodes such that the cell flow of each VP can be maintained within the prescribed characteristic while the end-to-end cell transfer quality for VCs can be estimated easily and accurately. In the network, a cell transfer from the VC exchange nodes to the VP exchange nodes is controlled within prescribed traffic characteristics specified to VPs; a cell transfer quality at each of the VC exchange node is specified in terms of a first cell transfer quality dependent on the control of the cell transfer, and a second cell transfer quality independent on the control of the cell transfer; a cell transfer quality at each of the VP exchange node is specified by a third cell transfer quality independent on the control of the cell transfer alone; an end-to-end cell transfer quality for each VC in the network is estimated in terms of the cell transfer quality of each of the VC exchange nodes and the cell transfer quality of each of the VP exchange nodes; and the bandwidth management in the network is carried out such that the estimated end-to-end cell transfer quality becomes higher than a desired quality of service.

18 Claims, 7 Drawing Sheets

METHOD OF CONTROLLING COMMUNICATION NETWORK INCORPORATING VIRTUAL CHANNELS EXCHANGE NODES AND VIRTUAL PATHS EXCHANGE NODES

This is a continuation-in-part application of our earlier commonly assigned application Ser. No. 07/777,164 filed Oct. 16, 1991, and abandoned.

BACKGROUND OF THE INVENTION

1. Field of the Invention

The present invention relates to a method of controlling a communication network such as an ATM (Asynchronous Transfer Mode) network which incorporates a number of VP (virtual path) exchange nodes and VC (virtual channel) exchange nodes.

2. Description of the Background Art

In recent years, progress has been made for developing an ATM network as a network architecture for realizing a broad band company integrating network and a high speed and broad band data communication in a form of B-ISDN (broadband-integrated service digital network) system. In the ATM network, data are transmitted in units of cells, and each cell has a header containing a VCI (virtual channel identifier) for identifying a connection between end-users and a VPI (virtual path identifier) for identifying a logical communication path, such that the desired transfer of the cell is achieved at a number of exchange nodes according to these VCI and VPI.

There are two types of exchange nodes in the ATM network, including a VC exchange node which carries out the exchange operation for each VC according to the VCI, and a VP exchange node which carries out the exchange operation for each VP according to the VPI. The VP is set up between the VC exchange nodes, and provides a direct logical path between the VC exchange nodes through one or more VP exchange nodes. The VP exchange node carries out the exchange operation in units of VP by using the VPI only regardless of the VCI, while the VC exchange nodes carries out the exchange operation in units of VC by using both the VCI and the VPI. The set up control for VC including operations such as an admission control operation and a routing table renewal operation is carried out only at the VC exchange nodes.

A conventional ATM network using both of the VC exchange nodes and the VP exchange nodes has a schematic configuration shown in FIG. 1, where the network includes: a VC exchange node 101 for receiving the VCs from a user terminal 100 at which the admission of the VCs is determined and the admitted VCs are multiplexed and outputted to VPs; a VP exchange node 111 for receiving the VPs from the VC exchange node 101 and multiplexing and outputting them to a transmission path 121; a VP exchange node 112 for receiving the multiplexed VPs from the transmission path 121 and switching them into a transmission path 122 as well as other transmission paths (not shown); a VP exchange node 113 for receiving the multiplexed VPs from the transmission path 122 and separating and outputting them; and a VC exchange node 102 at which the VCs are separated from the VPs received from the VP exchange node 113 and transmitted to another user terminal (not shown).

As shown in FIG. 1, the VC exchange node 101 has: an input port 131 at which the cell flow for each VC arriving From the user terminal 100 is monitored; an ATM switch 132 For performing a switching operation on the VCs received by the input port 131; an output port 133 for performing the priority control at its buffer (when the priority control is necessary), multiplexing the VCs outputted by the ATM switch 132 into VPs and outputting them to a transmission path: and a bandwidth managing unit 134 for performing the VC admission control in response to the VC set up requests from the user terminal 100 in which the number of VCs admitted at the input port 131 and the allocation of the VCs to be outputted at the output port 133 are controlled in order to secure the required quality of service. Also, separate controlling in units of VP is provided at each of the VP exchange nodes 111, 112, and 118.

Now, in the ATM network, it is preferable to achieve a highest transmission bandwidth utilization efficiency within a limit of maintaining a prescribed cell transfer quality. To this end, it is necessary for the network to carry out an appropriate bandwidth allocation control by constantly comprehending the cell transfer qualities in the network which depend on a loading state of the network at each moment.

In the VP based ATM network, two levels of such a bandwidth allocation control will be necessary. Namely, a control of the allocation of the VC to the VP, and a control of the allocation of the VP to the physical transmission path. The former is a control performed for each call (each VC) for which only the VC exchange nodes will be relevant. The latter is a control performed on a basis of a relatively long term traffic demand, in which the VP capacity and the route can be changed according to the loading state of the network.

In order to carry out these bandwidth allocation controls appropriately, it is necessary to know what kind of influence each level of bandwidth allocation has on the cell transfer quality in the network, where the following facts should be accounted for.

In carrying out the allocation of the VC to the VP, it becomes necessary to estimate the cell transfer quality resulting from the multiplexing of the VC into the VP according to the prescribed bandwidth (cell flow) specified to each VP and the bandwidth (cell flow) specified for each VC. However, the VP will be further multiplexed into the transmission path, so that in the actual cell transfer phase the cell transfer quality will be affected by the cell flows of the other VPs which are multiplexed together.

On the other hand, the bandwidth (cell flow) of each VP is controlled to be within the prescribed bandwidth by the control of the allocation of the VC to the VP. However, in the actual cell transfer phase, the cell flows of various VCs belonging to various VPs transmitted from a number of input transmission paths will be switched to the output transmission path of a target VP, such that there is a possibility for violating the prescribed bandwidth specified to the target VP depending on the arrival timing of the cell flows arriving at the target VP from the different input transmission paths.

For example, as shown in FIG. 2, when the prescribed minimum cell interval in the VP is 10 cell time, the cells which are evenly distributed within the 100 cell time such as those of the VP1 obtained from the VC1 to VC10 (prescribed minimum cell interval for each of these VCs is set to be 100 cell time) cause no problem, but the cells which are unevenly distributed within the 100 cell time such as those of the VP10 obtained from the VC91 to VC100 (prescribed minimum cell interval for each of these VCs is set to be 100 cell time) will cause a problem as they are actually beyond the given capacity of the VP, and this will eventually affect the cell transfer qualities of the other VPs as they are multiplexed together on the transmission path.

In addition, in a case that the allocation of the VC to the VP is carried out by allowing the bandwidth of the VP to exceed the prescribed bandwidth temporarily on a basis of the statistical multiplexing effect, there is a possibility for violating the prescribed bandwidth specified to the target VP regardless of the arrival timing of the cell flows arriving at the target VP from the different input transmission paths.

Now, in a case that the actual cell flow of a certain VP is violating the bandwidth prescribed to this VP, such a VP can statistically influence the other VPs which shares the same transmission path with that VP beyond the limit of the influence estimated at a time each of these other VPs is allocated to that transmission path, such that there is a danger of causing the lower cell transfer qualities for the other VPs than expected.

In order to avoid such a problematic situation, it is necessary to regularly monitor the cell flow at each VP and carry out a transfer control capable of maintaining the cell flow of each VP within the prescribed bandwidth. Moreover, it is necessary to establish the method of specifying the cell transfer quality at the VC exchange node and the VP exchange node as well as the method of estimating the end-to-end cell transfer quality for VCs in such a transfer control.

However, in a conventional ATM network, a need for such a transfer control has been neglected and therefore such a method of specifying the cell transfer quality at the VC exchange node and the VP exchange node and a method of estimating the end-to-end cell transfer quality for the VCs in such a transfer control have not been established.

SUMMARY OF THE INVENTION

It is therefore an object of the present invention to provide a method of controlling the communication network incorporating VC exchange nodes and the VP exchange nodes such that the cell flow of each VP can be maintained within the prescribed characteristic while the end-to-end cell transfer quality for VCs can be estimated easily and accurately.

According to one aspect of the present invention there is provided a method of controlling a communication network including VC (virtual channel) exchange nodes and VP (virtual path) exchange nodes, where each of the VC exchange nodes carries out cell exchange operations in units of VC, each of the VP exchange nodes carries out cell exchange operations in units of VP, and VPs are provided between the VC exchange nodes through the VP exchange nodes, the method comprising the steps of: (a) controlling cell-transfer from the VC exchange nodes to the VP exchange nodes such that cell flow of each VP is controlled within. prescribed traffic characteristics specified to said each VP; (b) specifying a cell transfer quality at each of the VC exchange node in terms of a first cell transfer quality dependent on a control of the cell transfer at the step (a), and a second cell transfer quality independent on the control of the cell transfer at the step (a); (c) specifying a cell transfer quality at each of the VP exchange node by a third cell transfer quality independent on the control of the cell transfer at the step (a) alone; (d) estimating an end-to-end cell transfer quality for each VC in the communication network in terms of the cell transfer quality of each of the VC exchange nodes specified at the step (b) and the cell transfer quality of each of the VP exchange nodes specified at the step (c); and (e) carrying out a bandwidth management in the communication network such that the end-to-end cell transfer quality estimated at the step (d) becomes higher than a desired quality of service.

According to another aspect of the present invention there is provided a communication network, comprising: VC (virtual channel) exchange nodes, each of the VC exchange nodes carrying out cell exchange operations in units of VC; VP (virtual path) exchange nodes, each of the VP exchange nodes carrying out cell exchange operations in units of VP, where VPs are provided between the VC exchange nodes through the VP exchange nodes; and output control means for controlling cell transfer from the VC exchange nodes to the VP exchange nodes such that cell flow of each VP is controlled within prescribed traffic characteristics specified to said each VP; wherein each of the VC exchange nodes has a cell transfer quality specified in terms of a first cell transfer quality dependent on a control of the cell transfer by the output control means, and a second cell transfer quality independent on the control of the cell transfer by the output control means, while each of the VP exchange nodes has a cell transfer quality specified by a third cell transfer quality independent on the control of the cell transfer by the output control means alone; and each of the VC exchange nodes estimates an end-to-end cell transfer quality for each VC in the communication network in terms of the cell transfer quality of each of the VC exchange nodes and the cell transfer quality of each of the VP exchange nodes, and carries out a bandwidth management to maintain the estimated end-to-end cell transfer quality above a required quality of service.

Other features and advantages of the present invention will become apparent from the following description taken in conjunction with the accompanying drawings.

DETAILED DESCRIPTION OF THE PREFERRED EMBODIMENTS

Figure 1:
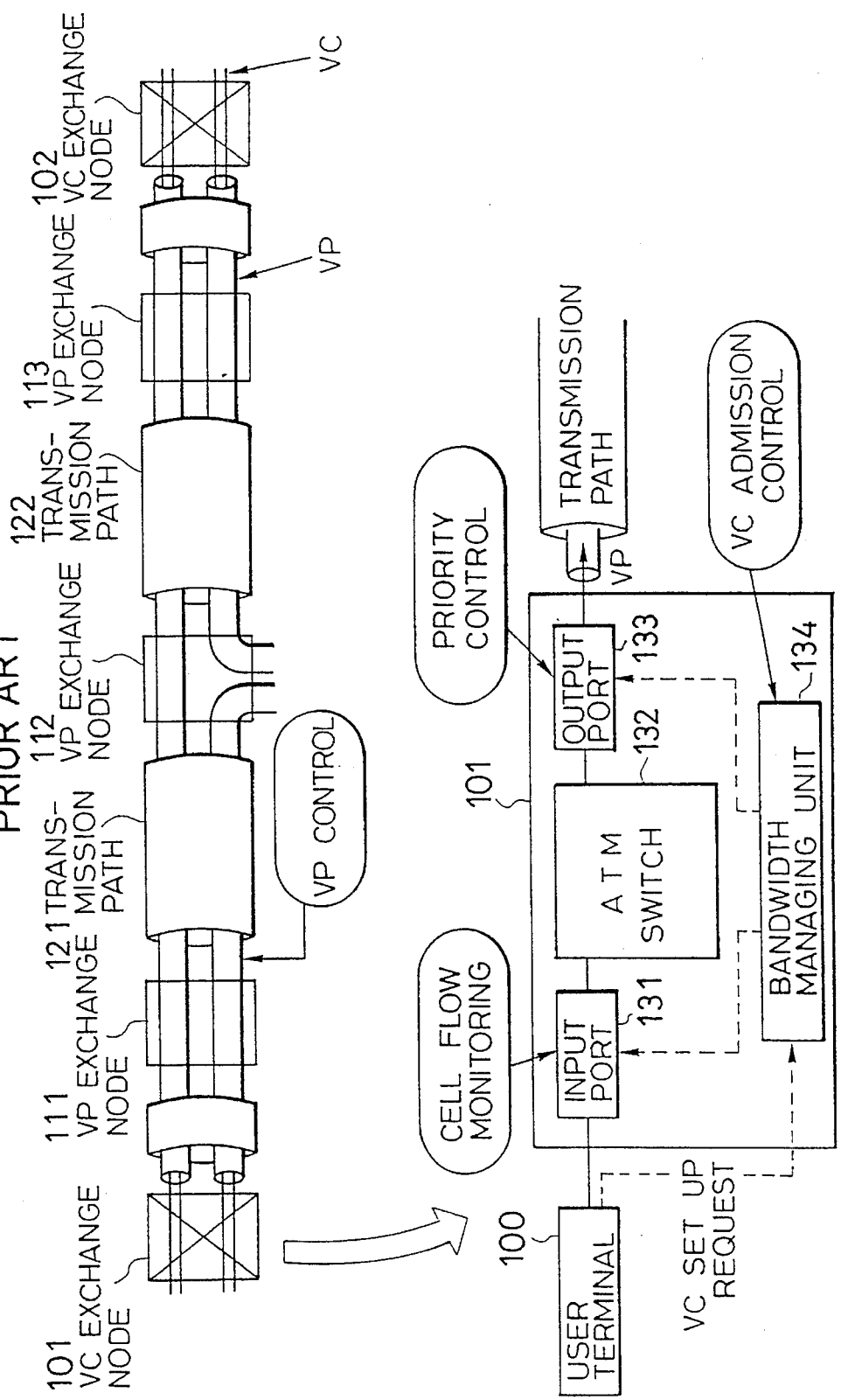
FIG. 1 is a schematic configuration diagram for a conventional ATM network using the VC exchange nodes and the VP exchange nodes.
Figure 2:
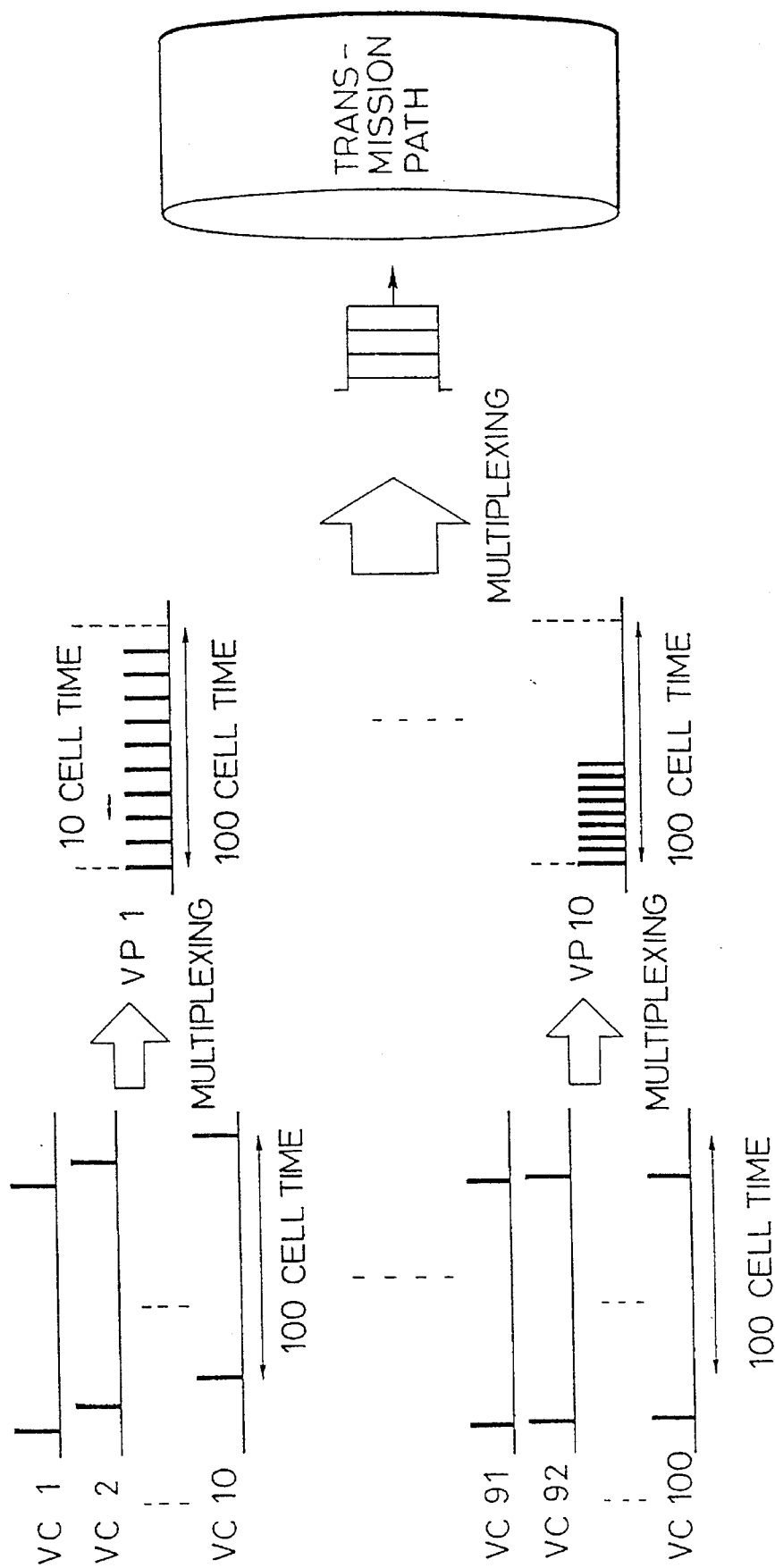
FIG. 2 is a diagram of cell flows in the VCs and VPs, illustrating a problem arising in the conventional ATM network.
Figure 3:
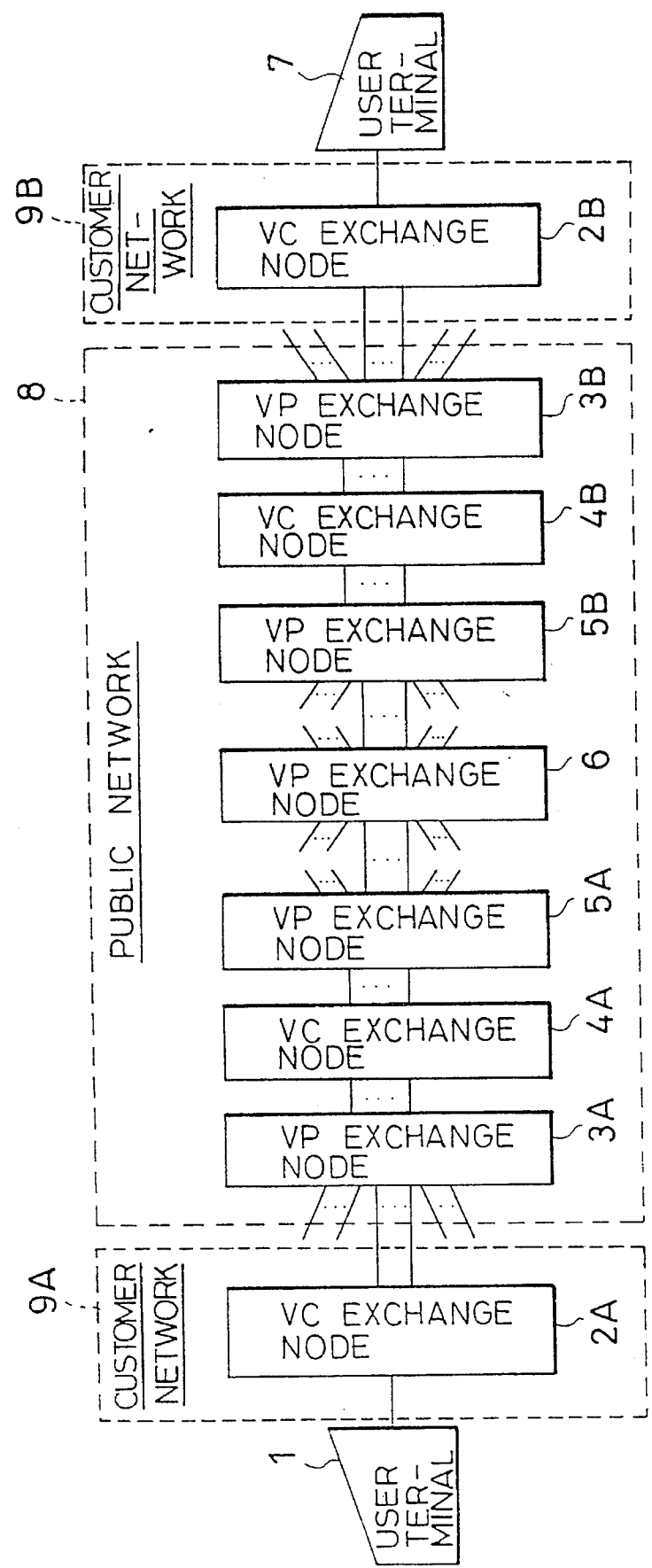
FIG. 3 is a schematic diagram for one embodiment of an ATM network using the VC exchange nodes and the VP exchange nodes according to the present invention.

Referring now to FIG. 3, one embodiment of an ATM network using the VC exchange nodes and the VP exchange nodes will be described in detail.

In this embodiment, the ATM network generally comprises: a plurality of user terminals 1 and 7; customer networks 9A and 9B to which the user terminals 1 and 7 are connected and which are owned by a user such as a company, and a public network 8 owned by a telecommunication network carrier. The customer networks 9A and 9B includes a VC exchange node 2A and a VC exchange node 2B, respectively. On the other hand, the public network 8 includes a plurality of VC exchange nodes 4A and 4B as well as a plurality of VP exchange nodes 3A, 5A, 6, 5B, and 3B.

Here, each VP exchange node performs an exchange operation in units of VP and multiplexes or separates the cell flows to and from the transmission path in units of VP, while each VC exchange node performs an exchange operation in units of VC and multiplexes or separates the cell flows to and from the VP in units of VC, and then multiplexes or separates the cell flows to and from the transmission path in units of VP. The control of the allocation of the VPs to the transmission path including a VP capacity setting is carried out on a basis of a long term or short term traffic demand, independently from the control of the allocation of the VCs to the VPs which is carried out every time the VC set up request is received from a user.

The VP exchange nodes 3A and 3B connected with the VC exchange nodes 2A and 2B, respectively, function to combine or separate the VPs from a plurality of customer networks. The VC exchange nodes 4A and 4B connected with the VP exchange nodes 3A and 3B, respectively, function to terminate VPs and carry out the exchange operation in units of VC in the public network 8. The VP exchange nodes 5A and 5B connected with the VC exchange nodes 4A and 4B, respectively, function to transmit the cell flows to and from the other VP exchange nodes such as the VP exchange node 6 provided in the public network 8.

Figure 4:
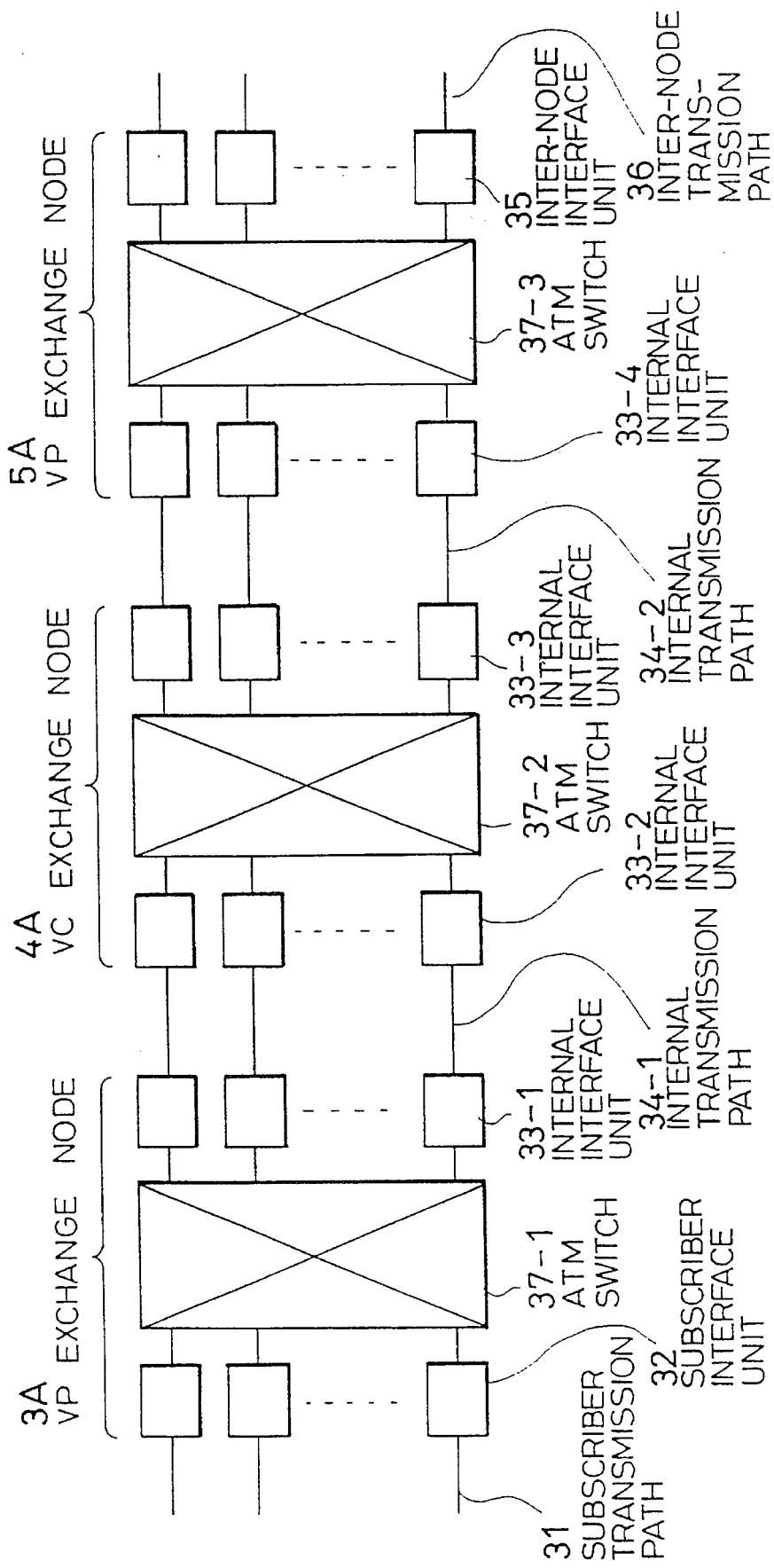
FIG. 4 is a detail diagram for a part of the ATM network of FIG. 3.

In further detail, the VP exchange nodes 3A and 5A and the VC exchange node 4A in the public network 8 has a configuration shown in FIG. 4.

The VP exchange node 3A comprises: a subscriber interface unit 32 connected to a subscriber transmission path 31; an internal interface unit 33-1 connected to an internal transmission path 34-1 between the VP exchange node 3A and the VC exchange node 4A; an ATM switch 37-1; and a control unit (not shown). The VC exchange node 4A comprises: an internal interface unit 33-2 connected to the internal transmission path 34-1; an internal interface unit 33-3 connected to an internal transmission path 34-2 between the VC exchange node 4A and the VP exchange node 5A; an ATM switch 37-2; and a control unit (not shown). The VP exchange node 5A comprises: an internal interface unit 33-4 connected to the internal transmission path 34-2; an inter-node interface unit 35 connected to an inter-node transmission path 36; an ATM switch 37-3; and a control unit (not shown). Here, each of the interface units 32, 33-1, 33-2, 33-3, 33-4, and 35 has an input interface function as well as an output interface function.

At the subscriber interface unit 32 and the internal interface unit 33-1 of the VP exchange node 3A and the internal interface unit 33-4 and the inter-node interface unit 35 of the VP exchange node 5A, the VPI to be rewritten and the output interface number are added to the header of the entered cell by looking up the header conversion table according to the VPI of the entered cell.

At the ATM switches 37-1 and 37-3 of the VP exchange nodes 3A and 5A, the cell is transferred by hardware to the desired output interface according to the output interface number in the header of the cell. In general, the cells of a plurality of VPs are multiplexed together in the cells entering from the input interface, and the cells of a plurality of VPs are multiplexed together in the cells outputted to the output interface.

At the internal interface units 33-2 and 33-3 of the VC exchange node 4A, the VPI/VCI to be rewritten and the output interface number are added to the header of the entered cell by looking up the header conversion table according to the VPI/VCI of the entered cell.

At the ATM switch 37-2 of the VC exchange node 4A, the cell is transferred by hardware to the desired output interface according to the output interface number in the header of the cell. In general, the cells of a plurality of VPs are multiplexed together in the cells entering from the input interface, and the cells of a plurality of VCs are multiplexed together in each VP. Also, the cells of a plurality of VPs are multiplexed together in the cells outputted to the output interface, and the cells of a plurality of VCs are multiplexed together in each The VC exchange node 4A is further equipped with a VP shaping unit 40 shown in FIG. 5 on its internal interface unit 33-3. In the following, it is assumed that the ATM switch 37-2 of the VC exchange node 4A has a sufficiently fast operation speed and that the deterioration of the cell transfer quality at the internal interface unit 33-2 and the ATM switch 37-2 is negligibly small.

This VP shaping unit 40 comprises: a VP demultiplexing unit 41 for separating the cells received from the ATM switch 37-2 into different VPs according to the VPIs of the received cells; shaping buffers 42-1 to 42-n provided in correspondence to VPs which may be divided either physically or logically to which the cells separated by the VP demultiplexing unit 41 are stored according to their VPs; a transfer control unit 44 for controlling the output rate of the shaping buffers 42-1 to 42-n in order to control the cell flows within the prescribed bandwidth of each VP; a VP multiplexing unit 46 for multiplexing the cells outputted from the shaping buffers 42-1 to 42-n under the control of the transfer control unit 44; and an output buffer 47 for storing the multiplexed cells obtained by the VP multiplexing unit 46 before they are outputted to the internal transmission path 34-2A between the VC exchange node 4A and the VP exchange node 5A in accordance with the transmission path speed.

Figure 6A:
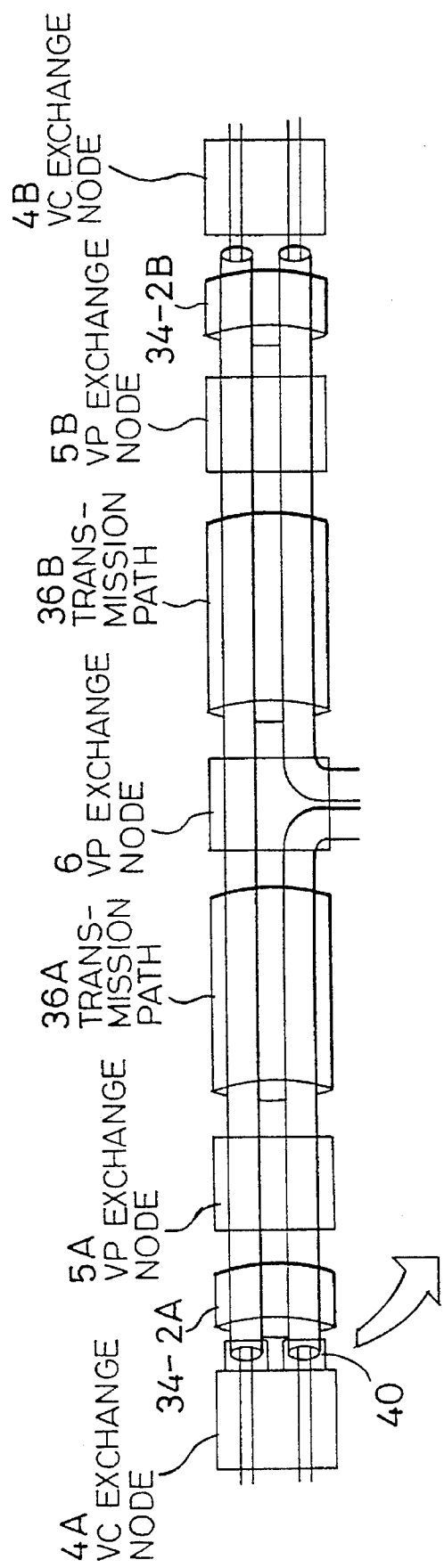
FIG. 6 is a schematic diagram for a part of the ATM network of FIG. 3, illustrating a function of a VP shaping unit provided at a VC exchange node.
Figure 6B:
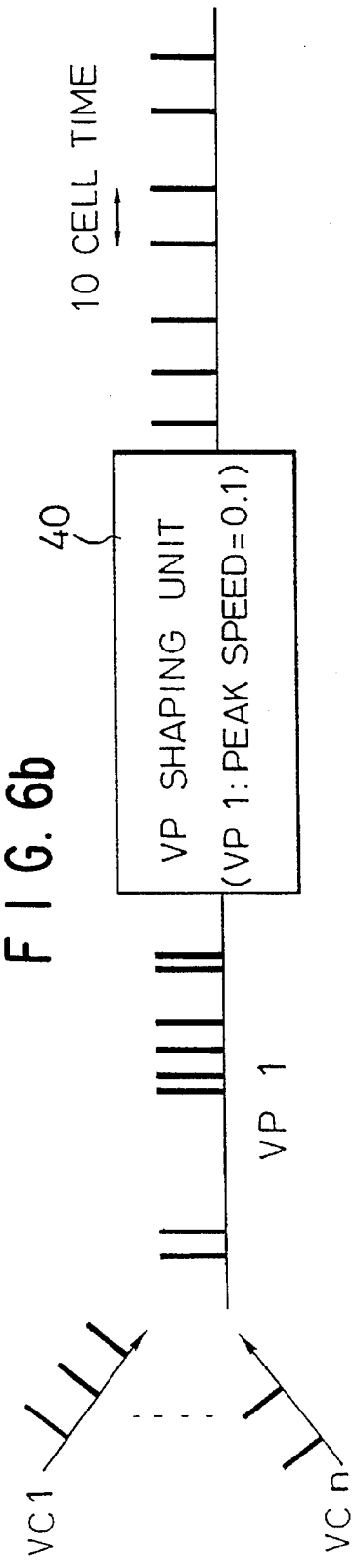

This VP shaping unit 40 functions to shape the cell flow in each VP such that the cells are outputted while maintaining the prescribed bandwidth as shown in FIG. 6.

The cells entered from the ATM switch 37-2 to the VP shaping unit 40 will pass through one of the shaping buffers 42-1 to 42-n as well as the output buffer 47, and the deterioration of the cell transfer quality such as a cell transfer delay and a cell loss in this embodiment can be attributed to these buffer effects alone.

Here, the cell transfer delay or the cell loss at the shaping buffers 42-1 to 42-n (referred hereafter as the first cell transfer quality) can be estimated from the traffic characteristics corresponding to the capacity specified to each VP and the traffic characteristics specified for each VC multiplexed in that VP. This first cell transfer quality related to the transfer control for each VP in a form of shaping can be specified to each VP at any desired level, and different levels may be specified to different VPs.

On the other hand, the cell transfer delay or the cell loss at the output buffer 47 (referred hereafter as the second cell transfer quality) can be estimated from the payload capacity of the internal transmission path and the traffic characteristics specified to each VP multiplexed in this internal transmission path which is the maximum allowable cell flow corresponding to the capacity of that VP rather than the actual cell flow in that VP.

Thus, the cell transfer quality at the VC exchange node can be represented by the first cell transfer quality related to the VP shaping and second cell transfer quality related to the multiplexing of VPs.

Now, the cell transfer quality at the VC exchange node described above varies every time a new VC is set up or released. In such a case, however, only the first cell transfer quality can be regarded as varying every time a new VC is set up or released while regarding the second cell transfer quality as unchanged. This is because the first cell transfer quality depends on the information regarding how many VCs of what kinds of characteristics are set up in each VP which changes every time a new VC is set up or released, while the second cell transfer quality depends on the information regarding how many VPs of what kinds of specified characteristics are set up in each transmission path, i.e., the predetermined capacity of each VP and a number of VPs, so that this second cell transfer quality can be considered as independent of the information regarding how many VCs are set up in each VP.

In contrast to the VC exchange node, the VP exchange node has no transfer control for each VP, and the cell flows received from the ATM switch are stored at an output buffer and then outputted to the transmission path as they are. This is because the cell flow of each VP is always controlled within the prescribed bandwidth of that VP by the transfer control at the VC exchange node before being transmitted to the VP exchange nodes, so that there is no need for the VP exchange nodes to repeat the same transfer control again.

Thus, the cell transfer quality at the VP exchange node can be represented by the third cell transfer quality due to the output buffer alone, which can be estimated from the capacity of the transmission path and the prescribed bandwidth specified in advance to each VP multiplexed in that transmission path. Consequently, the cell transfer quality at the VP exchange node can be regarded as a fixed value unaffected by the set up or release of a new VC in that VP, for which the worst possible estimation value is used.

Figure 7:
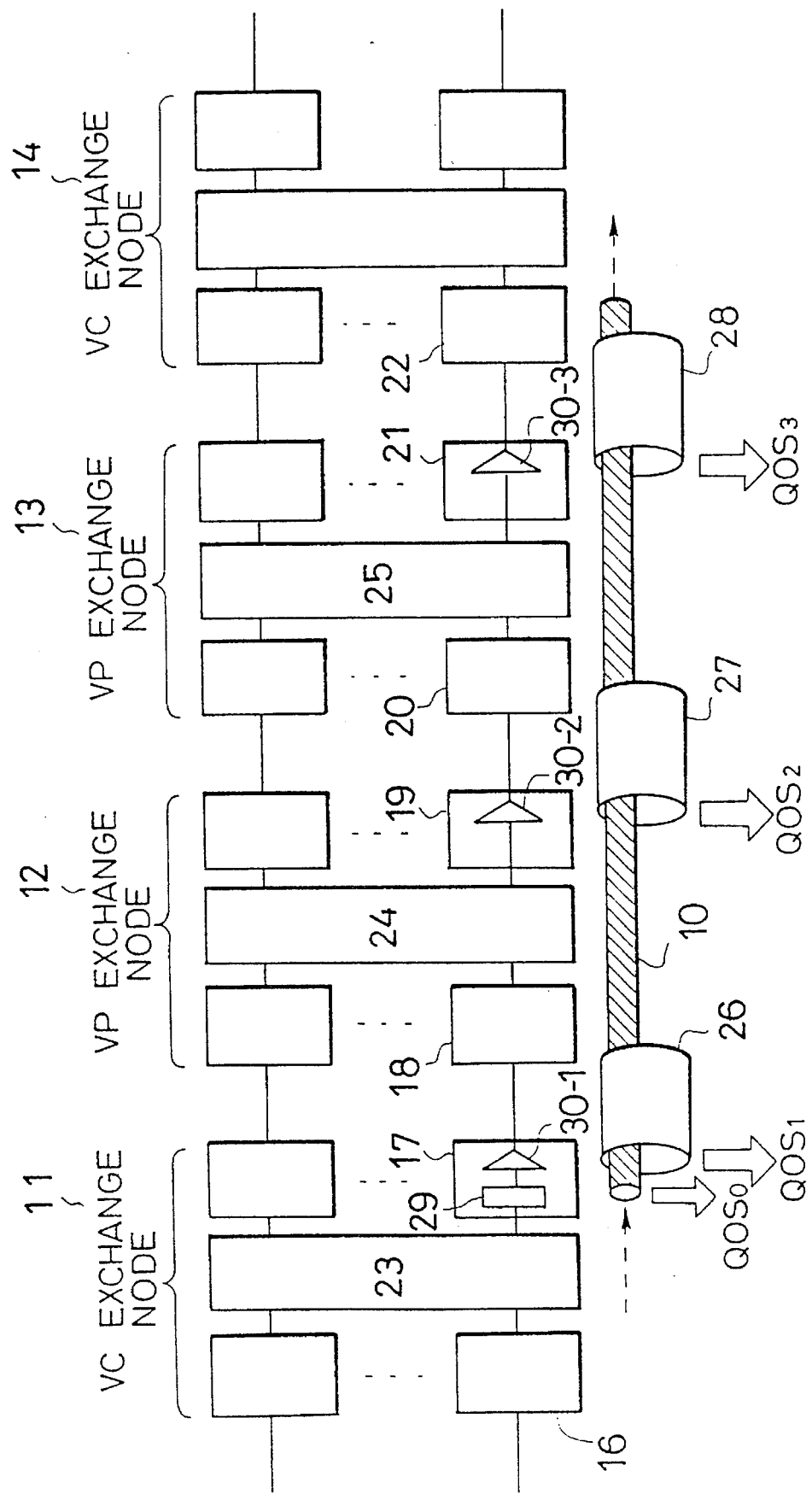
FIG. 7 is a detail diagram for an example of an ATM network according to the present invention, for explaining the operation of the present invention.

Referring now to FIG. 7, a case of transmitting the cell flow of a certain VC in a certain VP will be described in order to explain the operation in the ATM network described above.

In the following, an exemplary case using the minimum interarrival time TO(VP) as the traffic descriptor of VP, the minimum interarrival time TO(VC) as the traffic descriptor of VC, and the leaky bucket scheme with the bucket size B and the leak rate R will be described. (See, J. S. Turner: "New Directions in Communications", IEEE Commun. Mag., Vol. 24, No. 10, p. 8, October 1986.) It is to be noted here that the cases using other types of the traffic descriptors can be handled in the similar manner> Moreover, for the sake of simplicity, the case of using the cell loss rate as the cell transfer quality will be described below, but it should be noted that the case using the transfer delay as the cell transfer quality can be handled in the similar manner.

FIG. 7 illustrates a case in which the VP 10 is provided from the VC exchange node 11 to the VC exchange node 14 through the VP exchange nodes 12 and 13. The VC exchange node 11 has an input interface unit 16, an ATM switch 23, and an output interface unit 17; the VP exchange node 12 has an input interface unit 18, an ATM switch 24, and an output interface unit 19; the VP exchange node 13 has an input interface unit 20, an ATM switch 25, and an output interface unit 21; and the VC exchange node 14 has an input interface unit 22. Also, the VC exchange node 11 and the VP exchange node 12 are connected by a transmission path 26, the VP exchange node 12 and the VP exchange node 13 are connected by a transmission path 27, and the VP exchange node 13 and the VC exchange node 14 are connected by a transmission path 28.

In the following, the ATM switches 23, 24, and 25 of the VC exchange node 11 and the VP exchange nodes 12 and 13 are assumed to have a sufficiently large throughput and the deterioration of the cell transfer quality at the ATM switch is assumed to be negligibly small.

Figure 5A:
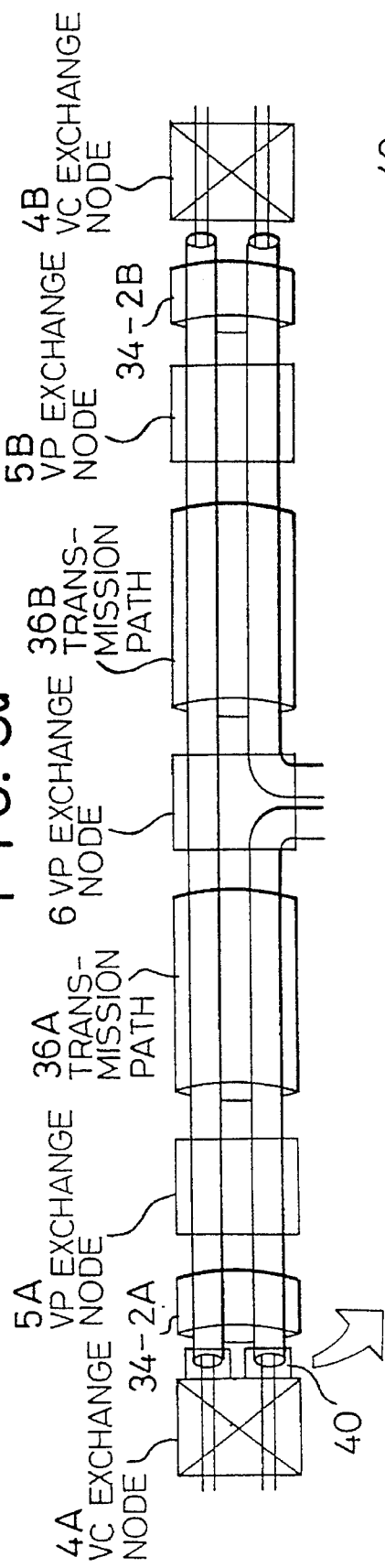
FIG. 5 is a schematic diagram for a part of the ATM network of FIG. 3, showing a detail view of a VP shaping unit provided at a VC exchange node.
Figure 5B:
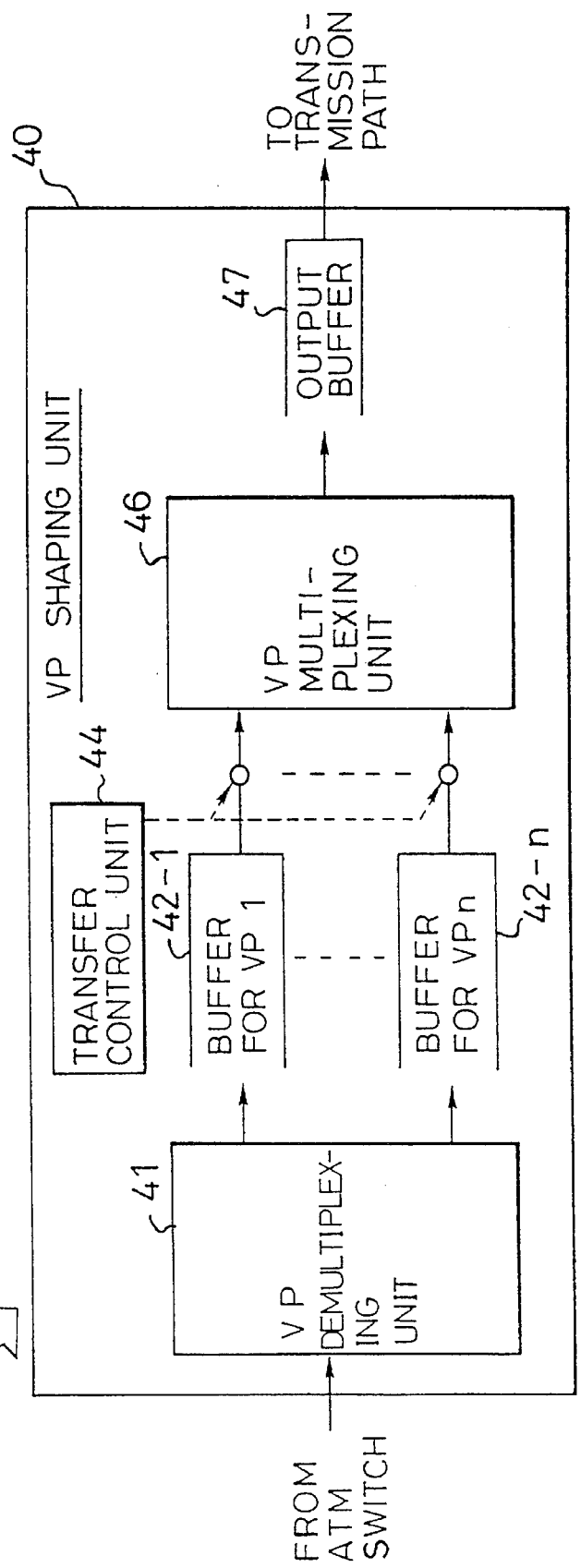

Now, at the VC exchange node 11, a cell flow of a certain VC is transmitted from the input interface unit 18 through the ATM switch 23 to the output interface unit 17. This output interface unit 17 of the VC exchange node 11 is equipped with a VP cell transfer control function 29 and a VP multiplexing function 30-1. Here, the VP cell transfer control function 29 carries out the VP shaping. Namely as shown in FIG. 5, the cells are demultiplxed into VPs and each demultiplexed VP is supplied into the buffer for this VP such that the time interval greater than or equal to the minimum interarrival time TO(VP) is present between successive cells outputted from the buffer.

Here, the worst possible value $QOS_0$ is given by the probability for the cell to be discarded at the buffer for each VP, which can be calculated by the following equation, as described in H. Suzuki et al.: "A Burst Traffic Control Strategy for ATM Networks", Proc. of GLOBECOM'90, 505.6, 1990.

$$QOS_0 = \frac{1}{\sum_i Ri} \sum_{\sum \delta i TO(VCi) \geq TO(VP)} \sum_i +1 Pi(\delta i) \left[ \sum_i \delta i TO(VCi) - TO(VP) \right]$$

where TO(VCi) is the minimum interarrival time for the i-th VC multiplexed into the VP, Ri is the leak rate of the leaky bucket for the i-th VC, $\delta i = 0$ or 1, and $$Pi(\delta i) = \begin{cases} 1 - \frac{Ri}{TO(VCi)} & \text{for } \delta i = 0 \\ \frac{Ri}{TO(VCi)} & \text{for } \delta i = 1 \end{cases}$$

This value $QOS_0$ is the first cell transfer quality. As can be seen from the above equations that this first cell transfer quality can be determined solely from the traffic descriptor of VC and the traffic descriptor of VP.

On the other hand, at the VP multiplexing function 30-1, the similar cell loss occurs. Here, the worst possible value of the cell loss rate at the output buffer of the VP multiplexing function 30-1 which gives the second cell transfer quality $QOS_1$ can be obtained from the capacity C of the transmission path and the traffic descriptor TO(VP) of VP alone, by applying the $\Sigma Di/D/1$ model as described in G. Ramamurthy et al.: Delay Analysis of a Packet Voice Multiplexer by the $\Sigma Di/D/1$ Queue", IEEE Trans. Commun., Vol. 39, No. 7, p. 1107, July 1991. Note here that this second cell transfer quality $QOS_1$ is independent of the traffic descriptor of VC.

Next, the cell flow is transmitted from the VC exchange node 11 through the transmission path 26 to the VP exchange node 12. Then, at the input interface unit 18, the VPI of the cell is looked up, and according to the routing information obtained from the VPI, the cell flow is transmitted through the ATM switch 24 to the output interface unit 19. This output interface unit 19 of the VP exchange node 12 is equipped with a VP multiplexing function 30-2, so that the cell transfer quality at this VP exchange node 12 can be deteriorated by the cell transfer delay or the cell loss at the output buffer associated with the VP multiplexing function 30-2 (third cell transfer quality). The estimation value for the third cell transfer quality at the VP multiplexing function 30-2 is represented as $QOS_2$.

Here, the cell loss rate at the VP multiplexing function 30-2 can be obtained similarly as the cell loss rate at the VP multiplexing function 80-1 described above, by using only the traffic descriptor of VP, because the VP cell transfer control function 29 guarantees that the VP characteristic is satisfying the traffic descriptor.

Similarly, the cell flow is transmitted from the VP exchange node 12 through the transmission path 27 to the VP exchange node 13. Then, at the input interface unit 20, the VPI of the cell is looked up, and according to the routing information obtained from the VPI, the cell flow is transmitted through the ATM switch 25 to the output interface unit 21. This output interface unit 21 of the VP exchange node 13 is equipped with a VP multiplexing function 30-3, so that the cell transfer quality at this VP exchange node 13 can be deteriorated by the cell transfer delay or the cell loss at the output buffer associated with the VP multiplexing function 30-3 (third cell transfer quality). The estimation value for the third cell transfer quality at the VP multiplexing function 30-3 is represented as $QOS_3$.

Next, the cell flow is transmitted from the VP exchange node 13 through the transmission path 28 to the VC exchange node 14. Then, at the input interface unit 22, the VPI/VCI of the cell is looked up, and the operation in units of VC is carried out at the VC exchange node 14 which terminates the VP 10.

Thus, the estimation value for the cell transfer quality of this certain VC through the VP connection 10 is specified by the first cell transfer quality $QOS_0$ and the second cell transfer quality $QOS_1$ at the VC exchange node 1, the third cell transfer quality $QOS_2$ at the VP exchange node 12, and the third cell transfer quality $QOS_3$ at the VP exchange node 18. More specifically, the worst possible value of the cell loss rate which gives the end-to-end cell transfer quality QOSe–e can be expressed:

$$QOSe-e=1-(1-QOS_0)(1-QOS_1)(1-QOS_2)(1-QOS_3)$$

and in a case all of $QOS_0$, $QOS_1$, $QOS_2$, and $QOS_3$ are sufficiently small compared with 1, the end-to-end cell transfer quality is given by:

$$QOSe-e=QOS_0+QOS_1+QOS_2+QOS_3$$

Among these, only the first cell transfer quality $QOS_0$ at the VC exchange node 11 varies every time a new cell is set up or released in the VP 10. The second and third cell transfer qualities $QOS_1$, $QOS_2$ and $QOS_3$ are estimated on a basis of the capacities (upper limit for cell flow) specified in advance to the VPs multiplexed in the transmission paths, so that they can be set equal to a fixed value unaffected by the set up or release of a new VC in each VP, for which the worst possible estimation value is used. Consequently, the safe estimation can be made for these second and third cell transfer qualities.

The bandwidth management is carried out to make the cell transfer quality not to become lower than the desired quality. To this ned, before the VC is actually set up, the end-to-end cell transfer quality expected to be obtained when the new VC is set up is obtained by the above described manner. In a case the obtained end-to-end cell transfer quality becomes lower than the desired quality (i.e., when the value becomes greater in a case of the cell loss rate), the set up of the new VC is not carried out. In this manner, it becomes possible to make the end-to-end cell transfer quality not to become lower than the desired value.

Also, as the other example of the bandwidth management, it is possible to change the traffic descriptor of VP. Namely, when the cell transfer quality of VC passing through a certain VP becomes close to the desired quality, it becomes difficult to set up the new VC in that VP. In such a case, if the cell transfer quality of the VC passing through the other VP is very good one, by changing the traffic descriptor of VP such that both of these cell transfer qualities become close to each other, it becomes possible to set up the new VC in the VP, and the ATM network can be used efficiently.

As explained above, in this embodiment, the VP exchange node have no need to carry out the bandwidth management in units of VC even when a new VC is set up or released in each VP. Also, by appropriately setting the allowable value for the $QOS_0$ for each VP which corresponds to an upper limit of a load allowed to each VP, the end-to-end cell transfer quality can be secured within a limit given by the worst possible value, and various different cell transfer qualities can be realized at the VC exchange node without affecting the VP exchange node. In other words, the quality designing at the VC exchange node and the quality designing at the VP exchange node can be separated completely.

It is to be noted that many modifications and variations of the above embodiment may be made without departing from the novel and advantageous features of the present invention. Accordingly, all such modifications and variations are intended to be included within the scope of the appended claims.

What is claimed is:

1. A method of controlling a communication network including VC (virtual channel) exchange nodes and VP (virtual path) exchange nodes, where each of the VC exchange nodes carries out cell exchange operations in units of VC, each of the VP exchange nodes carries out cell exchange operations in units of VP, and VPs are provided between the VC exchange nodes through the VP exchange nodes, the method comprising the steps of:

(a) controlling cell transfer from the VC exchange nodes to the VP exchange nodes such that cell flow of each VP is controlled within prescribed traffic characteristics specified to said each VP;

(b) specifying a cell transfer quality at each of the VC exchange node in terms of a first cell transfer quality dependent on a control of the cell transfer at the step (a), and a second cell transfer quality independent on the control of the cell transfer at the step (a);

(c) specifying a cell transfer quality at each of the VP exchange node by a third cell transfer quality independent on the control of the cell transfer at the step (a) alone;

(d) estimating an end-to-end cell transfer quality for each VC in the communication network in terms of the cell transfer quality of each of the VC exchange nodes specified at the step (b) and the cell transfer quality of each of the VP exchange nodes specified at the step (c); and (e) carrying out a bandwidth management in the communication network such that the end-to-end cell transfer quality estimated at the step (d) becomes higher than a desired quality of service.

2. The method of claim 1, wherein at the step (a), the control of the cell transfer achieves a VP shaping of the cell flows in the VPs.

3. The method of claim 2, wherein at the step (a), the VP shaping is achieved by using shaping buffer means for storing cells transmitted from each of the VC exchange node to each of the VP exchange node and transfer control means for controlling an output rate for each VP from the shaping buffer means.

4. The method of claim 3, wherein at the step (b), the first cell transfer quality is related to operations of the shaping buffer means.

5. The method of claim 4, wherein at the step (b), the first cell transfer quality is estimated by using traffic characteristics of VCs and VP.

6. The method of claim 1, wherein at the step (b), the second cell transfer quality is related to a multiplexing of VPs into a physical transmission path.

7. The method of claim 6, wherein at the step (b), the second cell transfer quality is regarded as a worst possible value predictable by using traffic characteristics of VPs and a capacity of the physical transmission path.

8. The method of claim 1, wherein at the step (b), the third cell transfer quality is related to a multiplexing of VPs into a physical transmission path.

9. The method of claim 8, wherein at the step (c), the third cell transfer quality is regarded as a worst possible value predictable by using traffic characteristics of VPs and a capacity of the physical transmission path.

10. A communication network, comprising:

VC (virtual channel) exchange nodes, each of the VC exchange nodes carrying out cell exchange operations in units of VC;

VP (virtual path) exchange nodes, each of the VP exchange nodes carrying out cell exchange operations in units of VP, where VPs are provided between the VC exchange nodes through the VP exchange nodes; and output control means for controlling cell transfer from the VC exchange nodes to the VP exchange nodes such that cell flow of each VP is controlled within prescribed traffic characteristics specified to said each VP;

wherein each of the VC exchange nodes has a cell transfer quality specified in terms of a first cell transfer quality dependent on a control of the cell transfer by the output control means, and a second cell transfer quality independent on the control of the cell transfer by the output control means, while each of the VP exchange nodes has a cell transfer quality specified by a third cell transfer quality independent on the control of the cell transfer by the output control means alone; and each of the VC exchange nodes estimates an end-to-end cell transfer quality for each VC in the communication network in terms of the cell transfer quality of each of the VC exchange nodes and the cell transfer quality of each of the VP exchange nodes, and carries out a bandwidth management to maintain the estimated end-to-end cell transfer quality above a required quality of service.

11. The network of claim 10, wherein the output control means control the cell transfer so as to achieve a VP shaping of the cell flows in the VPs.

12. The network of claim 11, wherein the output control means includes: shaping buffer means for storing cells transmitted from each of the VC exchange node to each of the VP exchange node; and transfer control means for controlling an output rate for each VP from the shaping buffer means.

13. The network of claim 12, wherein the first cell transfer quality is related to operations of the shaping buffer means.

14. The network of claim 13, wherein the first cell transfer quality is estimated by using traffic characteristics of VCs and VP.

15. The network of claim 10, wherein the second cell transfer quality is related to a multiplexing of VPs into a physical transmission path.

16. The network of claim 15, wherein the second cell transfer quality is regarded as a worst possible value predictable by using traffic characteristics of VPs and a capacity of the physical transmission path.

17. The network of claim 10, wherein the third cell transfer quality is related to a multiplexing of VPs into a physical transmission path.

18. The network of claim 17, wherein the third cell transfer quality is regarded as a worst possible value predictable by using traffic characteristics of VPs and a capacity of the physical transmission path.

* * * * *